United States Patent [19]

Nydigger

[11] Patent Number: 5,050,468
[45] Date of Patent: Sep. 24, 1991

[54] METHOD AND APPARATUS FOR CUTTING A CIRCUMFERENTIAL SERPENTINE GROOVE IN A WORKPIECE USING AN ENGINE LATHE

[75] Inventor: James D. Nydigger, Albany, Oreg.

[73] Assignee: B-J Enterprises, Inc., Albany, Oreg.

[21] Appl. No.: 629,051

[22] Filed: Dec. 14, 1990

Related U.S. Application Data

[62] Division of Ser. No. 433,045, Nov. 7, 1989, abandoned.

[51] Int. Cl.⁵ .......................... B23B 3/00; B23B 3/28
[52] U.S. Cl. .......................................... 82/1.11; 82/18; 82/118; 82/134; 364/474.02
[58] Field of Search .................... 82/19, 158, 118, 133, 82/134, 132, 1.11, 11, 18, 11.4, 11.5, 137, 154; 364/474.02

[56] References Cited

U.S. PATENT DOCUMENTS

| | | | |
|---|---|---|---|
| 2,010,662 | 8/1935 | Geer | 82/19 |
| 2,585,329 | 2/1952 | Johnson | 82/19 |
| 3,643,644 | 2/1972 | Nadalini | 82/11.1 |
| 3,983,769 | 10/1976 | McConnell et al. | 82/19 |
| 4,143,564 | 3/1979 | DeBiasse | 82/11.1 |
| 4,203,062 | 5/1980 | Bathem | 82/137 X |
| 4,302,992 | 12/1981 | Skrentner | 82/233 |
| 4,584,915 | 4/1986 | Ichiyanagi et al. | 82/19 |
| 4,605,392 | 8/1986 | Achelpohl | 493/196 |
| 4,609,366 | 9/1986 | Ley et al. | 493/926 |
| 4,653,360 | 3/1987 | Compton | 82/118 X |
| 4,679,474 | 7/1987 | Lambrecht | 493/196 |
| 4,693,146 | 9/1987 | Dombrowski et al. | 82/118 |
| 4,702,731 | 10/1987 | Lambrecht et al. | 493/926 |

Primary Examiner—Larry I. Schwartz
Assistant Examiner—J. Daulton
Attorney, Agent, or Firm—Klarquist, Sparkman, Campbell, Leigh & Whinston

[57] ABSTRACT

Two preferred embodiments of an apparatus are disclosed for imparting combined synchronous reciprocating and oscillatory motions to a cutting tool of the type used with an engine lathe to cut a continuous circumferential serpentine-patterned groove in the surface of a workpiece held and rotated about an axis of rotation by the lathe. The tool is axially journaled and mounted on a slide block permitting oscillatory and reciprocating motions of the tool relative to the rotating workpiece. Direct inflexible drive mechanisms impart the reciprocating and oscillatory motions, where the motions are synchronous with each other and are timed so as to define an integral number of waves around the circumference of the workpiece. The first embodiment employs a cam, cam followers, and direct mechanical or hydraulic linkages therefrom utilizing a minimum of parts to impart the motions. The second embodiment employs two separate servo motors to impart the motions. Both embodiments permit the accurate, close-tolerance cuttiong of narrow, deep grooves of a serpentine pattern in hard workpiece materials such as steel without tool breakage.

16 Claims, 2 Drawing Sheets

METHOD AND APPARATUS FOR CUTTING A CIRCUMFERENTIAL SERPENTINE GROOVE IN A WORKPIECE USING AN ENGINE LATHE

This application is a division, of application Ser. No. 07/433,045, filed on Nov. 7, 1989 abandoned.

FIELD OF THE INVENTION

This invention relates generally to engine lathes, particularly to controlling the position and orientation of a cutting tool mounted on an engine lathe used to cut a profile in the surface of a workpiece held and turned by the lathe.

BACKGROUND OF THE INVENTION

Engine lathes are employed for machining operations wherein a workpiece is supported and turned on the lathe generally on a horizontal axis while a cutting or abrading tool is advanced into cutting engagement with the surface of the turning workpiece to form a circumferential profile on the workpiece.

A cutting tool for a lathe usually has a shank portion that is clamped in a tool holder mounted on the lathe carriage lateral to the workpiece. The shank of the clamped tool is usually oriented in the horizontal plane passing through the rotational axis of the workpiece. A cutting edge is located on one end (point) of the tool and is usually ground to have a particular shape for the job at hand. When the tool is clamped in the tool holder, the cutting edge is oriented toward the surface of the workpiece to be cut using the tool (referred to herein as the target surface).

The tool holder can be moved via a cross-feed mechanism toward or away from the workpiece and along a "longitudinal move" substantially parallel to the rotational axis of the workpiece. With many engine lathes, such movements of the cutting tool are motorized to permit, for example, precise cutting of threads in the surface of the workpiece.

Certain industrial operations such as rolling and roll-extruding require machinery having rollers. Generally, such rollers have a circular cross-section, such as cylindrical rollers, which can be made using an engine lathe. For example, plastic or elastomeric sheeting can be extruded between opposed counter-rotating rolls of a roller apparatus. In some situations, it is desirable to form such sheeting with integral ribbed patterns on one or both planar surfaces, which requires that at least one of the rollers in the roller apparatus have a surface grooved in a complementary pattern. To form sheets having straight ribs running the length of the sheeting, complementary circumferential grooves are required in the corresponding roller, which are easily cut into the roller surface using a conventional engine lathe. However, if the sheet design requires serpentine or wavy ribs, the required complementary serpentine or wavy grooves in the roller surface are virtually impossible to cut using a conventional engine lathe capable only of unidirectional movement of the cutting tool.

At least one other type of apparatus has been used for cutting such grooves, but with limited success. In particular, the workpiece is mounted on a multi-axis CNC milling machine employing a rotating cutting tool for cutting the grooves. One problem with using this approach is the extremely complex mechanism required to manipulate the workpiece in the required manner relative to the rotating cutting tool. Such complex mechanisms have inherent cumulative inaccuracies that can prevent the attainment of desired close tolerances in the finished product. The main problem with this approach is that the milling tool must have a diameter less than the width of the desired groove. For example, if a groove has a specified width of 1 mm, the milling tool diameter must be less than 1 mm. Such narrow milling tools necessarily have extremely small cutting teeth and are relatively flexible, resulting in a high rate of tool wear and breakage, poor finish of the groove in the workpiece, and poor adherence to specified tolerances. If the workpiece is fabricated from such hard materials as steel or stainless steel, cutting narrow serpentine-patterned grooves therein using such an apparatus is essentially impossible. In other words, a lathe operation is the best known method of cutting circumferential serpentine grooves in the surface of a workpiece.

When cutting grooves of a repeating serpentine pattern in the surface of a workpiece using an engine lathe, it is necessary that the cutting tool undergo several types of simultaneous periodic movements as it is urged into cutting engagement with the surface of the workpiece turning about its rotational axis. First, the tool must be moved in a reciprocating (limited periodic linear back and forth) manner along a line or path generally parallel to the target surface of the workpiece while keeping the longitudinal (or shank) axis of the tool oriented substantially normal to the target surface. The period of reciprocation must be coordinated with the angular velocity of the turning workpiece so as to form a continuous groove with the desired integral number of serpentine waves around the circumference of the workpiece. Since more than one pass of the tool over the circumferential target surface of the workpiece is virtually always required to cut any desired profile, the period of reciprocation of the tool must be an integral multiple of the circumference of the workpiece to form an integral number of complete wave cycles around the circumference of the workpiece.

Second, the cutting tool must be moved in an oscillatory manner (limited periodic clockwise/counterclockwise rotational motion about the longitudinal or shank axis of the tool) in synchrony with (having the same period as) the reciprocating movement of the cutting tool. The oscillatory motion is required because proper performance of the cutting tool requires that the cutting edge be urged against the material being cut at a substantially constant angle, generally in a normal orientation. If the cutting tool underwent only a reciprocating motion while cutting a serpentine groove circumferentially around the workpiece, the angle of the cutting edge of the tool relative to the serpentine pattern would always be changing, resulting in poor cutting performance and probable fracture of the cutting tool. Hence, the cutting tool must be rotated periodically on its shank axis in both directions (i.e., oscillated) in synchrony with the reciprocating movement of the cutting tool during the cutting operation in order to ensure that the cutting angle remains substantially constant at all instantaneous positions of the cutting edge on the serpentine pattern.

One profiling machine capable of imparting combined reciprocating and oscillatory movement of the cutting tool used on an engine lathe is known to have been patented. Geer (U.S. Pat. No. 2,010,662) discloses an apparatus in which a cutting tool is mounted in a tool holder capable of limited rotational (oscillatory) rotation about the shank axis of the tool. The tool holder, in turn, is mounted to a block allowing the tool to be reciprocated in the horizontal plane along a line parallel to the rotational axis of the workpiece held in the engine lathe. In addition, the tool holder can be reciprocated in a direction transverse to the rotational axis of the workpiece. The combined movements of the cutting tool are dictated by cams rotated by a complex gear and driveshaft mechanism. The period of oscillation in the Geer apparatus is determined by assembling on the lathe gears having the appropriate gear ratio, which requires a complicated series of operational steps.

A key shortcoming of the Geer apparatus is its reliance upon a complex combination of gear trains, drive shafts, couplings, and cams to effect reciprocation and oscillation of the cutting tool. Because of the resulting large number of dynamically interacting parts, the resulting backlash, stacking of tolerances, and multiple clearances would render the apparatus incapable of achieving close machining tolerances. For example, a large roller having repeating courses of parallel serpentine grooves used to roll-extrude plastic sheeting used in manufacturing separator envelopes for plates used in storage batteries requires a groove depth-to-width ratio of 4:1 or greater, where the width of the groove is approximately 0.25 mm. The cutting tool for such a machining operation is necessarily very delicate and fragile. The positioning inaccuracies imparted to the combined reciprocating and oscillatory motions of the tool by an apparatus according to Geer would cause the cutting tool to rapidly fracture when used to cut such a groove.

A second disadvantage with the Geer apparatus is the difficulty inherent in using such a complex apparatus as an "add-on" accessory to an existing conventional engine lathe. A number of special modifications to the lathe would be required to fit the Geer device to it. Also, the Geer device comprises a large number of extraneous parts attached to the lathe that in combination lack the structural rigidity of the lathe itself. Modern engine lathes are constructed of heavy rigid components to minimize flex and dimensional distortion. As a result, it would be advantageous to utilize as much of the structural framework of the lathe itself whenever a special machining apparatus is retrofitted to the lathe.

Hence, there is a need for a method and apparatus for cutting close-tolerance serpentine-shaped grooves in a circumferential target surface of a workpiece supported by and turned on an engine lathe.

There is also a need for a method and apparatus for cutting deep, narrow serpentine-shaped grooves in a circumferential target surface of a workpiece supported by and turned on an engine lathe.

There is also a need for such an apparatus that can be retrofitted easily to an existing engine lathe without any significant deterioration of dimensional tolerances otherwise achievable with the lathe alone.

There is also a need for such an apparatus that uses few additional parts that must be fitted to an existing engine lathe.

SUMMARY OF THE INVENTION

The present invention comprises methods and apparatus for accurately cutting close-tolerances circumferential serpentine-patterned grooves in the surface of a workpiece supported and turned about an axis of rotation by an engine lathe. The invention includes both mechanical and electro-mechanical embodiments that have enabled, for the first time, the accurate and precise cutting of extremely narrow and deep serpentine-patterned grooves in a workpiece without fracturing the delicate cutting tool. Such results are possible by the employment of minimal numbers of dynamically interacting parts, thereby minimizing backlash and tolerance stacking.

In the preferred mechanical embodiment, the serpentine pattern to be cut into the surface of the workpiece is defined by the circumferential surface of at least one cam or the like. While two cams may be employed, one controlling reciprocating motion and the other controlling oscillatory motion, one cam is preferable for controlling both because of the inherent simplicity of adjusting the proper phase shift of the oscillatory motion relative to the reciprocating motion with a single cam. The cam is preferably rotated about an axis at an angular velocity equal to the angular velocity of the workpiece. To ensure such equality of angular velocities, the cam is preferably coaxially mounted to the same lathe chuck that holds the workpiece as the workpiece is turned. A separate cam follower engaging the cam is employed for each of the reciprocating and oscillatory motions.

For reciprocation, the cutting tool is mounted on a linear slide laterally adjacent the target surface. For oscillation, the cutting tool is coaxially mounted in a bearing or journal allowing clockwise and counterclockwise rotation of the tool about its shank axis. The slide is preferably coupled via a tie rod or similar direct mechanical linkage to the cam follower controlling reciprocating motion. The shank of the tool is preferably hydraulically coupled to the cam follower controlling oscillatory motion. As the workpiece and cam rotate about their axes, the cutting tool is urged via the cam, cam followers, and direct, inflexible connecting linkages to undergo synchronous reciprocation and oscillatory motions necessary to cut the serpentine shaped groove with minimal opportunity for backlash, lost motion, or tolerance stacking.

In an electro-mechanical embodiment, the cam is replaced with a rotary encoder sensing the angular velocity, angular position, and rotational direction of the workpiece. The cutting tool is mounted in a bearing or journal mounted on a linear slide. The slide is reciprocated by a first reversible electrical motor such as a servo motor having an armature terminated by a screw threaded into the slide. The cutting tool is oscillated by a second reversible electrical motor such as a servo motor mounted to the slide and having an armature coupled directly to the shank of the cutting tool. Each motor has a rotary encoder coupled to it for sensing the angular velocity, angular position, and rotational direction of its armature. All encoders and motor-driving circuits are connected to a programmable process controller. The controller has electronic memory containing a serpentine-wave generating algorithm. Before beginning to cut a particular-shaped workpiece, the operator inputs parameter values into the process controller such as circumference of the target surface of the workpiece, number of wave peaks desired around the circumference, and amplitude of the peaks. The electro-mechanical embodiment has the benefit of not requiring a separate cam for each different serpentine design; the operator merely programs in the requisite parameter data to generate a new serpentine pattern.

An object of the present invention is to provide a method and apparatus for accurately cutting an extremely narrow and deep circumferential serpentine-patterned groove in a workpiece using a cutting tool on an engine lathe.

Another object is to provide such a method and apparatus that employ a minimal number of dynamically interacting parts so that tolerance stacking, backlash, and related phenomena that otherwise degrade accuracy and precision of machining operations are kept to a minimum so as to allow such extremely narrow and deep grooves to be cut.

Another object is to provide such a method and apparatus that is easily usable with an existing engine lathe and utilizes much of the existing structural rigidity of the lathe itself, thereby minimizing tolerance stackup and flexing that degrade accuracy and precision of cutting.

DETAILED DESCRIPTION

FIG. 1 Embodiment

Figure 1:
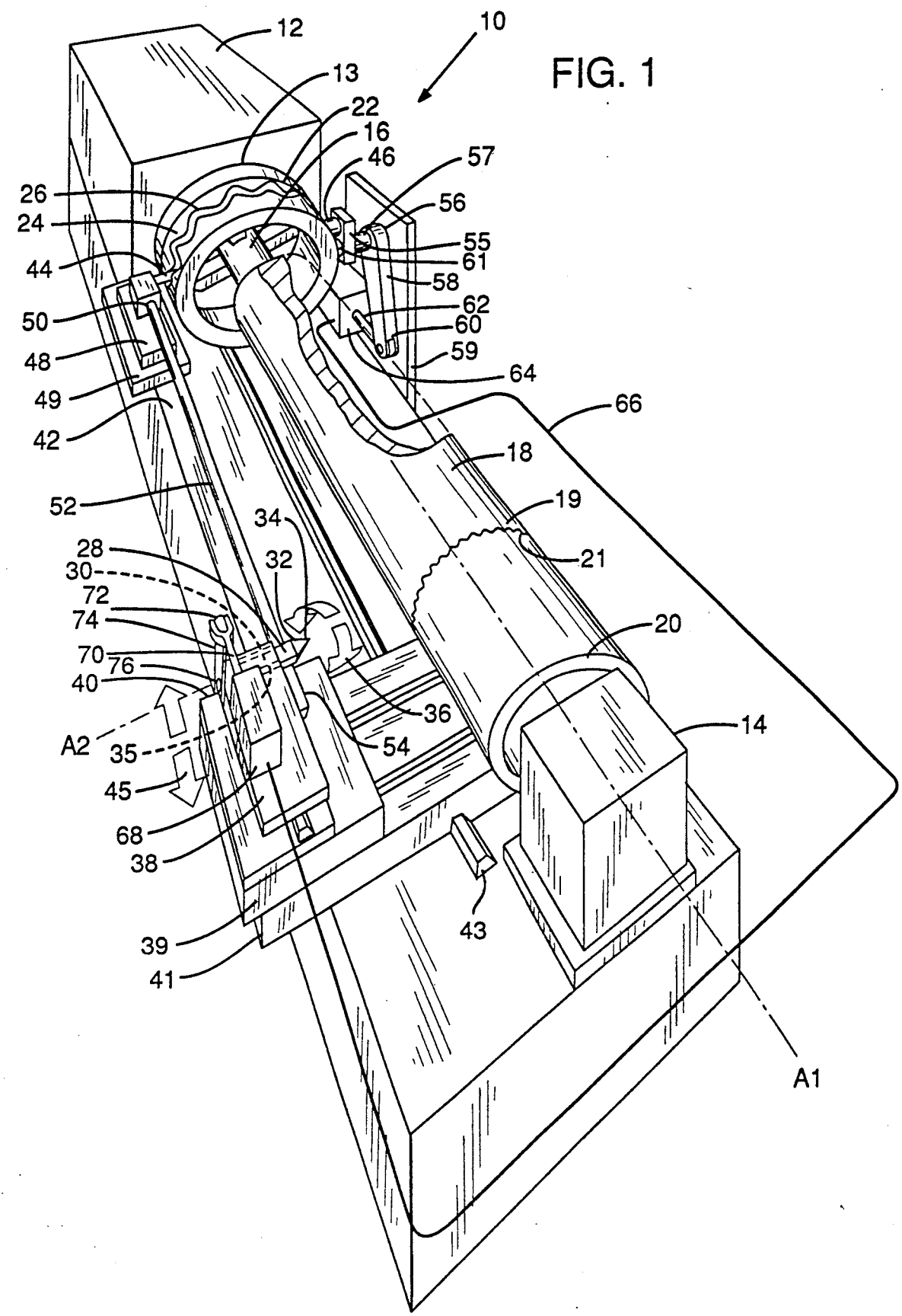

FIG. 1 shows a conventional engine lathe 10 comprising a headstock 12 and a tailstock 14 coaxially aligned with the headstock 12. Generally, the headstock 12 includes a multi-jawed chuck 13 extending coaxially therefrom toward the tailstock 14 for gripping one end 16 of the workpiece 18. The headstock chuck 13 is rotatably driven at a preselected angular velocity by a motor (not shown) inside the lathe 10, thereby rotating the workpiece 18 coaxially gripped by the chuck 13 about the rotational axis A1 of the workpiece 18. The other end 20 of the workpiece 18 may be coaxially gripped, if required, by a conventional tailstock chuck (not shown) extending toward the headstock 12 and coaxially mounted to a live center (not shown) rotatably mounting the tailstock chuck to the tailstock 14. If the workpiece 18 is longitudinally short, securing the other end 20 in a tailstock chuck may not be necessary. However, securing the workpiece 18 using the tailstock 14 is necessary if the workpiece is too long to be securely held only by the headstock chuck 13.

If required for supporting an extremely long and heavy workpiece while it is being turned, the lathe 10 can be fitted with or "steady rests" (not shown) which grip the workpiece at locations between the ends. Employing such additional supports for a large workpiece on an engine lathe is common practice in the machining art, which results in adherence to tighter tolerances when machining a large workpiece.

A template cam 22 having a cylindrical or other suitable surface 24 is preferably coaxially coupled directly to the face of the headstock chuck 13. Although the cam 22 can also be coaxially attached to either end of the workpiece 18 or in some other manner caused to rotate at the same angular velocity as the workpiece, a direct coaxial attachment to the face of the chuck is preferred because of the greater machining accuracy and precision inherent in such a direct and rigid mounting. A recessed circumferential channel 26 having a wavy or serpentine pattern of the desired period to be cut into the target surface of the workpiece is defined in the cam surface 24. A particular template cam 22 is distinctive for a given serpentine wave pattern around the circumference of the workpiece 18.

A cutting tool 28 typically comprises a shank portion 30 terminated on one end by a point 32 having at least one cutting edge 34. The shank 30 is journaled in a bearing 35 so as to permit at least limited periodic clockwise and counterclockwise rotation (arrows shown at 36) of the tool 28 about its shank axis A2. Such motion as described herein is termed "oscillation." The tool 28 is mounted coaxially in the bearing with the point 32 located on the shank axis A2 to prevent arcuate movement of the point 32 during oscillation. The bearing 35 is mounted on a slide block 38 slidably mounted on a base 40.

The slide base 40 ideally should be rigidly mounted to a fixed support on the lathe. Generally, however, it is advantageous to be able to change the longitudinal position of the block 40 relative to the workpiece 18. As a result, the slide base 40 is mounted atop a carriage 41 typically found on engine lathes that can be controllably manipulated by the operator along the "longitudinal moves" or ways 43 extending between the headstock 12 and the tailstock 14 beneath the workpiece 18. When the base 40 is held in a stationary position, the slide block 38 is free to undergo a reciprocating motion (linear back and forth as shown by arrows 45) relative to the base 40 along a line or path laterally offset from and coplanar with the rotational axis A1 of the workpiece 18. If desired, the base 40 can be oriented to allow the slide block 38 to reciprocate along a line parallel to the target surface 19 of the workpiece 18, if the target surface is not parallel to the rotational axis A1 of the workpiece 18. (As used herein, the target surface 19 is the location on the workpiece 18 into which a groove 21 is to be cut.) For most cutting operations, the cutting tool shank axis A2 lies substantially in the horizontal plane passing through the rotational axis A1 of the workpiece 18.

The engine lathe 10 also includes a conventional cross-feed mechanism (details not shown) to enable the operator to urge the cutting tool 28 into cutting engagement with the target surface 19 and to control the depth of the cut groove 21. As found on most conventional engine lathes, such a mechanism is typically a screw or the like (not shown) oriented transversely to the axis A1 and threaded passing through a second carriage 39 slidably mounted to the carriage 41. (In FIG. 1, the base 40 is mounted to carriage 39 which, in turn, is slidably mounted to carriage 41.) A crank or wheel (not shown) is coupled to the screw, whereby the operator rotates the screw to slide the second carriage 39 either toward or away from the workpiece 18. Advancing the second carriage 39 toward the workpiece 18 advances the tool 28 toward the target surface 19. If desired, the cross-feed mechanism can be digitally controlled as is found on many modern engine lathes.

Engaged with the template cam 22 are a first cam follower 44 and a second cam follower 46 in the cam channel 26. The first cam follower 44 directs the reciprocating motion of the slide block 38. The second cam follower 46 directs the oscillating motion of the cutting tool 28.

Although a single cam 22 is preferred, a separate cam for each of the first cam follower 44 and second cam follower 46 is also within the scope of the present invention. If multiple cams are employed, they are preferably "stacked" in a coaxial manner on the face of the headstock chuck 13. A single cam allows achievement of closer machining tolerances and easier adjustment of the phase of the oscillatory motion relative to the reciprocating motion.

The first cam follower 44 is mounted on a linear slide 48 mounted to a block 49 affixed to the lathe bed 42. The slide 48 permits reciprocation of the first cam follower 44 as the cam 22 rotates. The direction of reciprocation is along a line parallel to the rotational axis A1.

The linear slide 48 is coupled to a first end 50 of a tie rod 52. The tie rod 52 extends to and is coupled on a second end 54 thereof to the slide block 38. This direct connection of the first cam follower 44 to the slide block 38 ensures that, as the cam 22 rotates, the cutting tool 28 reciprocates relative to the rotating workpiece 18 at a precise period and amplitude as dictated by the wave pattern of the cam channel 26. Also, because the tie rod 52 is an inflexible direct linkage between the first cam follower 44 and the slide block 38, the ability of the lathe 10 to hold close tolerances is not significantly affected.

The tie rod 52 is preferably adjustable in length to permit simple and accurate movement of the block 41 (carrying the cutting tool 28) along the ways 43 to a second target surface of the workpiece 18 after cutting a groove 21 in the first target surface 19.

Although the first cam follower 44 is shown having a direct linkage via a tie rod 52 with the slide block 38, alternative linkages are also possible and within the scope of the present invention. For example, the first cam follower 44 can be coupled to the slide block 38 via a closed hydraulic linkage (not shown) similar to the hydraulic linkage of the second cam follower 46 discussed below. In such a hydraulic linkage, the first cam follower 44 is coupled via a linear slide to the piston of a "master" hydraulic cylinder. Tracking of the first cam follower 44 in the channel 26 causes the piston of the "master" cylinder to move back and forth in a reciprocating manner. Hydraulic fluid is thereby moved periodically to and from a "slave" hydraulic cylinder, the piston of which is coupled to the slide block 38. By selecting appropriate relative piston diameters of the master and slave cylinders, it is possible using such a hydraulic linkage to increase or -decrease the amplitude of reciprocation of the cutting tool relative to the corresponding amplitude of the waves in the cam channel 26.

It is preferred that the cam 22 be cylindrical in shape with a cylindrical surface defining the template pattern via a channel 26 cut into the surface of the cam. The cam surfaces of channel 26 positively drive the first cam follower 44 in both directions along the line of reciprocation. However, it is also possible to have the wave pattern defined, for example, by an outer edge of a disc-shaped cam and engaging therewith a cam follower urged against the cam via a spring or other biasing means (not shown). A cam 22 as shown in FIG. 1 is preferred because a spring-biased cam follower engaged against a disc-shaped cam may not achieve the desired accuracy when cutting serpentine grooves in certain materials or when the cam is rotated at an angular velocity other than very slowly.

The second cam follower 46 is also preferably engaged in the wave-patterned channel 26, but is separated from the first cam follower 44 sufficiently to ensure that the second cam follower 46 moves at a phase offset from the reciprocation of the first cam follower 44. Such a phase offset is necessary to ensure that the cutting edge 34 of the tool 28 engages the groove at the correct cutting angle. The second cam follower 46 actually undergoes an oscillatory motion as the cam 22 rotates. The second cam follower 46 is preferably coupled to one end of a short lever arm 55. The other end of the short lever arm 55 is rigidly mounted to a first end 56 of an adjustable-length lever arm 58 via a collar 57. The collar 57 is pivotally mounted via a pin 61 to a plate 59 or other fixed support mounted to the lathe bed 42. Since the first end 56 of long lever arm 58 is rigidly mounted to the collar 57, the entire assembly comprised of short arm 55, collar 57, and long arm 58 pivots as a single unit about the pin 61.

A second end 60 of the lever arm 58 is coupled to the piston 62 of a master hydraulic cylinder 64. The master hydraulic cylinder 64 is hydraulically coupled via a conduit 66 to a slave hydraulic cylinder 68, the piston 70 of which is coupled to one end 72 of a second lever arm 74. The opposite end 76 of the second lever arm 74 is coupled to the shank end of the cutting tool 28. As the second cam follower 46 moves in an oscillatory manner as driven by the rotating cam 22, the oscillation is hydraulically transmitted via incompressible hydraulic fluid through the master and slave hydraulic cylinders 64, 68, respectively, to the second lever arm 74, which translates the resulting reciprocating motion of the piston 70 to a periodic clockwise and counterclockwise rotation 36 (oscillation) of the cutting tool 28 about its shank axis A2. Since in this embodiment the reciprocating motion and oscillatory motions of the tool are both directed by a single rotating cam 22, the oscillatory motion 36 is necessarily synchronized but out of phase with the corresponding reciprocating motion 45 of the cutting tool 28.

Although the second cam follower 46 is shown hydraulically coupled to the shank 30 of the cutting tool 28, it is also possible to mechanically couple the second cam follower 46 to one end of the second lever arm 74 using a tie rod in a manner similar to that described and shown for the first cam follower.

The operation of the FIG. 1 embodiment is as follows: The lathe 10 contains a motor for rotating the headstock chuck 13 and the workpiece 18 clamped therein, as well as the cam 22, about the rotational axis A1 at a substantially constant angular velocity. As the cam 22 rotates, the first cam follower 44 is urged to undergo reciprocating motion and the second cam follower 46 is urged to undergo an oscillatory motion, where the amplitude of each motion is equal to the amplitude of the corresponding wave-shaped pattern of the channel 26. Reciprocation of the first cam follower 44 urges the slide block 38 to move in a reciprocating manner along a line, in the case of a cylindrical workpiece 18, substantially parallel to the rotational axis A1. The second cam follower 46 oscillates at the same frequency as but out of phase with the first cam follower 44. Via the hydraulic linkage as described, the oscillatory motion of the second cam follower 46 urges the cutting tool 28 to oscillate about its shank axis A2. Such oscillation of the cutting tool 28 is synchronous with but sufficiently phase-shifted relative to the reciprocating motion of the cutting tool 28, so as to ensure that the cutting edge 34 engages the target surface 19 at the correct cutting angle at all times. To actually cut the desired serpentine-shaped groove 21 into the target surface 19, the operator turns a cross-feed wheel or crank (not shown) on the lathe as described above to urge the point 32 of the tool 28 into cutting engagement with the target surface 19 of the rotating workpiece 18.

For most workpiece materials, it is also necessary that a flowing stream of cutting fluid or oil be directed at the point 32 of the cutting tool as it is cutting into the target surface. The fluid prevents overheating and premature dulling of the cutting edge.

After a groove 21 has been cut into the target surface 19 to the desired depth and width, the operator manipulates the cross-feed control to back the cutting tool 28 away from the target surface 19. If a groove is desired in another location on the workpiece 18, the operator manipulates another control (not shown) on the lathe to move the carriage 41 longitudinally along the ways 43 of the lathe to the new location.

Because the FIG. 1 embodiment employs a minimal number of moving parts to effect a combined reciprocation and oscillation of the cutting tool 28, it is capable of holding tight tolerances while cutting extremely narrow and deep parallel serpentine grooves on the surface of a workpiece. The dimensional stability of the FIG. 1 embodiment is also evidenced by the fact that multiple such grooves can be cut in a workpiece without breaking the cutting tool, a feat impossible with any other apparatus known to be in the relevant art. For example, the FIG. 1 embodiment has been used to successfully cut repeating courses of serpentine grooves about 0.25 mm wide and 1 mm deep in the surface of a stainless steel roller of having a diameter of about 1 foot and a length of about 6 feet. Such grooves were cut without fracturing the delicate cutting tool.

Another benefit of the FIG. 1 embodiment is that the requisite components are easily retrofitted to a conventional engine lathe. The cam 24 is mounted either to the headstock chuck 13 or to the workpiece 18. The assembly comprising the base block 40, slide block 38, cylinder 68, and journaled cutting tool 28 is mounted directly to a conventional cross-feed mechanism. Finally, the cam followers 44, 46 with supporting components are easily mounted to the lathe bed 42. Using such a minimal number of "add-ons" also ensures that the inherent structural rigidity of the lathe will be maximally employed, thereby minimizing structural flex with attendant wasted motion and tolerance stacking. As a result, the requisite close machining tolerances in the finished workpiece can be achieved with minimal tool breakage and premature dulling.

FIG. 2 Embodiment

Figure 2:
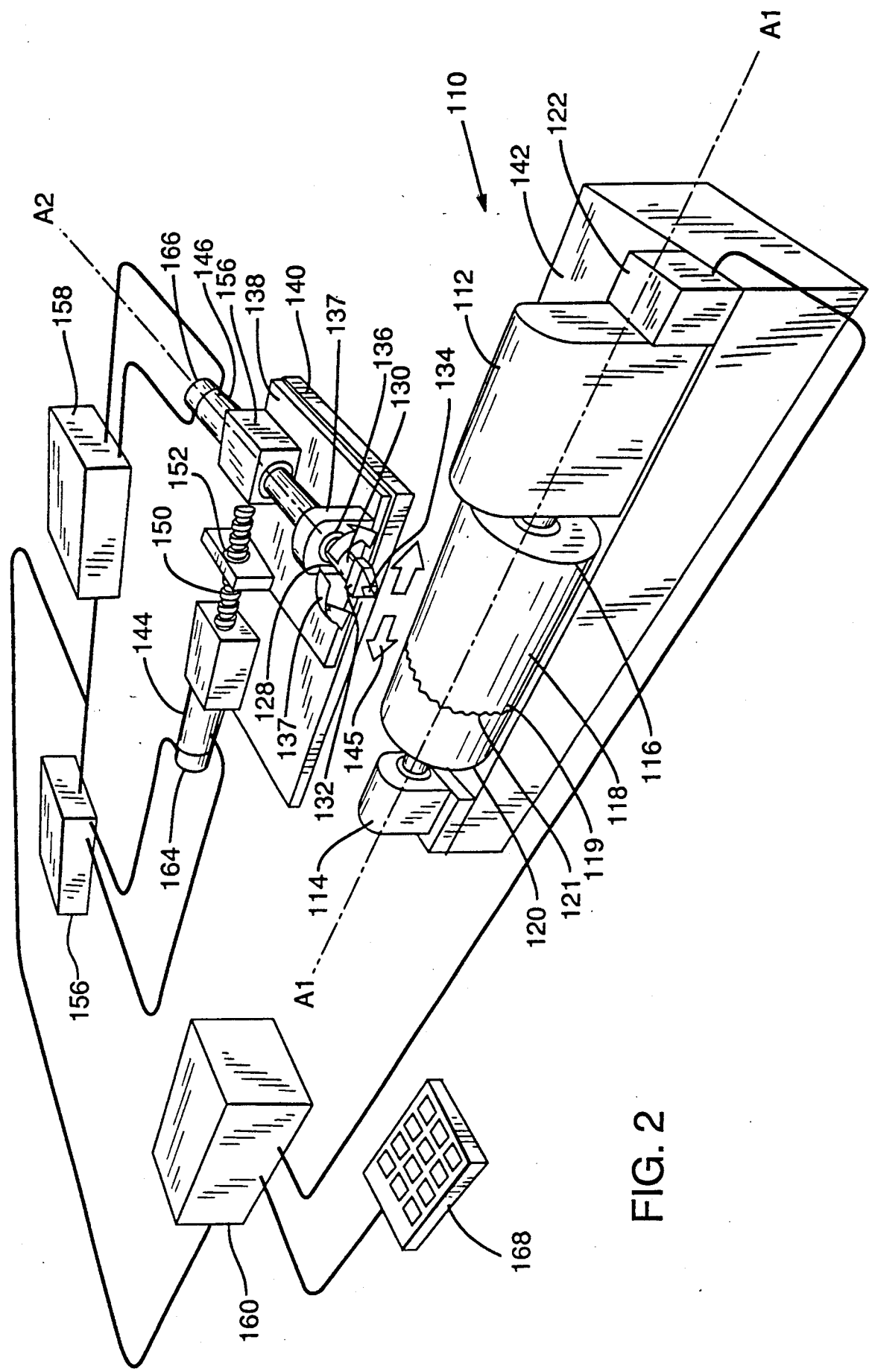

FIG. 2 shows a second embodiment of the present invention wherein the cam and mechanical or hydraulic linkages therefrom to the cutting tool as shown in FIG. 1 have been replaced by electromechanical components. A conventional engine lathe 110 is comprised of a headstock 112 and a tailstock 114 coaxially aligned with the headstock 112. A first end 116 of the workpiece 118 is gripped by a conventional chuck (not shown) extending from the lathe headstock 112. If required, a second end 120 of the workpiece 118 extends to and is coaxially held by the lathe tailstock 114 in a manner permitting rotation of the workpiece 118 about its axis A1. The lathe 110 contains a motor (not shown) for rotatably driving the headstock chuck and workpiece 118 at a desired angular velocity. A "spindle" rotary encoder 122 is employed to electronically sense the angular velocity, angular position, and rotational direction of the workpiece 118. The spindle rotary encoder 122 is coupled to a rotating shaft (not shown) having an angular velocity preferably equal to the angular velocity of the workpiece 118. Alternatively, the rotating shaft may be rotating at an angular velocity equal to a known integral multiple of, or a known ratio of the angular velocity of the workpiece 118. Suitable locations of such a drive shaft include the armature of the drive motor, a drive shaft (not shown) linking the motor to the headstock chuck, or other suitable location. (An example of a suitable spindle rotary encoder is type H25E-SS-4000-172-ABZC-8830-LED-SM18 manufactured by BEI Motion Systems Inc., Industrial Encoder Division, Goleta, Calif. 93117.)

A base 140 is mounted to the lathe via blocks (not shown) similar to the blocks 41 and 39 in FIG. 1, thereby allowing the base 140 to be operator-manipulated along "horizontal moves" or ways (not shown) and also in a conventional cross-feed manner, as discussed above with respect to the FIG. 1 embodiment. (In FIG. 2, the base 140 is shown detached from and elevated from the lathe 110 for clarity.) Slidably mounted to the base 140 is a slide block 138 movable relative to the base 140 along a line parallel to either the rotational axis A1 or the target surface of the workpiece 118, as required. A bearing 136 is mounted via a housing 137 to the slide block 138. The shank 130 of the cutting tool 128 is coaxially mounted in the bearing 136 so as to permit rotation of the cutting tool 128 in both directions about its shank axis A2. The cutting tool 128 as journaled in the bearing 136 is oriented such that its shank axis A2 is about perpendicular to the rotational axis A1 of the workpiece 128 and generally within a horizontal plane passing through the rotational axis A1. The point 132 of the cutting tool 128 is oriented toward the target surface 119. As with conventional engine lathes, the operator can adjust the longitudinal position of the base 140 relative to the workpiece 118 by manipulating a control such as a crank or wheel (not shown) on the lathe 110, thereby moving the cutting tool 128 to a new target surface on the workpiece 118. Also, the operator can cross-feed the cutting tool either toward or away from the workpiece 118 by manipulating a conventional cross-feed control such as a crank or wheel (not shown).

The slide block 138 is urged to move in a reciprocating manner relative to the base 140 so as to enable the tool 128 to describe a serpentine-shaped pattern on the target surface of the rotating workpiece 118. Such reciprocating motion is imparted via a first reversible servo motor 144 mounted on the base 140. (An example of a suitable servo motor is model E19-2 permanent magnet DC type manufactured by Electro-Craft Servo Products Division of Robbins and Myers, Eden Prairie, Minn. 55344.) The armature (not shown) of the first servo motor 144 is coaxially coupled to a ball screw 150 threaded into a ball nut 152 mounted on the slide block 138. Whenever the armature of the first servo motor 144 is caused to rotate, the slide block 138 is urged to move either left or right relative to the target surface, depending upon the direction of rotation of the armature.

The end of the cutting tool shank 130 opposite the point 132 is coaxially coupled to the armature (not shown) of a second reversible servo motor 146. (An example of a suitable servo motor is model E19-2, permanent magnet DC type, Electro-Craft Servo Products Division of Robbins and Myers, Eden Prairie, Minn. 55344.) The second servo motor 146 is mounted to a block 156 mounted to the slide block 138 coaxial with the cutting tool shank axis A2. Whenever the armature of the second servo motor 146 is caused to rotate either clockwise or counterclockwise, the cutting tool 128 is urged to rotate about its shank axis A2 in the same direction.

The first servo motor 144 and the second servo motor 146 are each electrically connected to a respective amplifier 156, 158, respectively, comprising the requisite conventional electronic circuitry for driving the corresponding servo motor. An example of an appropriate amplifier for a servo motor as designated above is type LA-5600 linear servo amplifier, Electro-Craft Servo Products Division of Robbins and Myers, Eden Prairie, Minn. 55344. Each amplifier 156, 158 is electrically connected to a programmable process controller (computer) 160. (An example of a suitable process controller is Model BAM-432, Berkeley Process Control, Inc., Richmond, Calif. 94804.) The computer 160 is also electrically connected to the spindle rotary encoder 122.

Separate rotary encoders 164, 166 are coaxially coupled to each servo motor 144 and 146, respectively. (An example of a suitable rotary encoder is type R80 manufactured by Renco Corp. Division of Robbins and Myers, Motion Control Group, Goleta Calif. 93117.) Each rotary encoder 164, 166 is also electrically connected to the corresponding amplifier 156, 158, respectively. Each rotary encoder 164, 166 generates electronic signals corresponding to the direction, angular velocity, and angular position of the corresponding servo motor armature 148, 154, respectively. Such electronic data is necessary feedback to the respective amplifiers 156, 158 and the computer 160 for ensuring proper period, amplitude, and relative phase of the requisite combined synchronous reciprocating and oscillating motions (arrows shown at 137 and 145, respectively) of the cutting tool during cutting of a serpentine groove 121 on the target surface 119.

A remote keypad 168 such as type HT/1000 from Termiflex Corp., Merrimack, N.H., is electrically connected to the computer 160. The keypad 168 is used to enter parameter values into the computer 160, as described below. The keypad 168 is also used to manually actuate the servo motors 144, 146 and to start the automatic cycles of reciprocation and oscillation of the cutting tool 128 as the workpiece 118 is rotating on the lathe 110.

The computer 160 automatically controls the operation of the servo motors 144, 148 using the spindle rotary encoder 122 as the "master" and the servo motors 144, 146 as the "slaves." Since the workpiece 118 typically rotates continuously in one direction about its axis A1 and at a constant angular velocity during a cutting operation, the spindle rotary encoder 122 generates a constant stream of corresponding electronic signals which are conducted to the computer 160. For every angular position of the workpiece 118, there is a corresponding angular position of each armature of the corresponding servo motor 144, 146, as sensed by the respective rotary encoder 164, 166. Angular positions of the armatures of servo motors 144, 146 relative to each angular position of the workpiece 118 are dictated by a serpentine wave-generating program in the memory of the computer 160 and by values for particular wave and workpiece parameters, as discussed below, that are entered by the operator using the keypad 168.

Briefly, the program operates as follows:

The wave-generating algorithm is stored in the read-only memory (ROM) of the computer 160. When turned on, the computer 160 loads the program from the ROM into the random-access memory (RAM) of the computer 160. When the operator depresses a first "function" key on the keypad 168, the computer 160 prompts the operator to supply values for the following parameters: number of desired wave cycles around the circumference of the target area 119; peak-to-peak width of the desired wave pattern; and the diameter of the target area 119.

The computer 160 then checks the validity of each of the above parameter inputs. If the inputs are valid, the computer 160 compares just-entered parameter values with the set of values previously entered (for example, on the previous workday). If there has been a change in any of the values, the computer 160 recalculates the requisite positions of the armatures of the servo motors 144, 146 corresponding to all possible angular positions of the spindle rotary encoder 122.

The program includes a homing routine that establishes an absolute reference point for the armatures of the first and second servo motors 144, 146. These reference points remain constant even in the event of a power loss. If power is lost during a cutting operation or if an error condition occurs while cutting a groove, the homing routine ensures that the same pattern can again be cut on the workpiece 118.

When the operator initiates execution of the homing routine, the computer 160 first confirms at the spindle encoder 122 that the workpiece 118 is rotating at 0.5 revolution per minute (rpm). If so, the computer 160 awaits an index marker pulse from the spindle encoder 122. When this pulse is received, the computer 160 establishes that the workpiece 118 is at the zero, or home, position. Next, the computer 160 homes the first servo motor 144 by running the motor 144 in one direction until a limit switch is contacted, then in the reverse direction until a marker pulse is sensed by the first servo encoder 164. This marker pulse thus establishes the home position for the first servo motor 144. The computer 160 then runs the second servo motor 146 in one direction until a marker pulse is sensed by the second servo encoder 166. This marker pulse thus establishes the home position for the second servo motor 146. The homing routine is now complete.

A "run" mode begins upon receipt by the computer 160 of the appropriate command from the operator at the keypad 168. The run mode requires a workpiece angular velocity of at least 0.5 rpm for initiation. When the angular velocity reaches 0.5 rpm, the computer 160 awaits an index marker pulse from the spindle encoder 122. Then, the computer 160 issues a command for the servo motors 144, 146 to "follow" the spindle encoder 122. At this time, reciprocating and oscillatory movements of the cutting tool 128 begin according to the parameter values as entered previously by the operator, described above. Rotation of the armatures of the servo motors 144, 146 continues to follow the rotation of the workpiece 118 until the computer 160 receives a signal from the operator to stop or until an error condition turns off the run mode.

The operator can manually turn off the combined motions of the servo motors 144, 146 relative to the rotation of the workpiece 118 by pressing a second function key on the keypad 168.

Once the workpiece 118 is rotating at the proper angular velocity for machining and the cutting tool 128 is undergoing the desired combination of synchronous reciprocating and oscillatory motions, the operator manipulates a crossfeed control (not shown) on the lathe 110 to move the cutting tool 128 toward the workpiece 118 until the cutting edge 134 makes cutting engagement with the target surface 119. After the groove 127 is cut to the desired depth and width, the operator backs the cutting tool 128 away from the workpiece 118 using the crossfeed control. If another groove is desired in another target surface of the workpiece 118, the operator manipulates another control (not shown) on the lathe 110 so as to move the slide base 140 to a new location adjacent the workpiece 118.

As the cutting tool 128 is cutting the groove 162 in the target surface, a stream of cutting fluid or oil (not shown) is directed at the cutting edge 134 of the tool 128 to prevent overheating and consequent premature dulling of the tool.

The FIG. 2 electromechanical embodiment has several advantages over a strictly mechanical embodiment as shown in FIG. 1. First, the FIG. 2 embodiment is digitally controlled using a process controller that can be programmed for a particular workpiece and for a particular serpentine pattern without changing any components on the lathe. Second, the serpentine pattern can be changed more easily, more simply, and more repeatably using the FIG. 2 embodiment. Third, an infinite variety of patterns may be generated using the same components.

Similar to the FIG! 1 embodiment, the FIG. 2 embodiment utilizes minimal components added to an engine lathe. Further, the FIG. 2 embodiment is easily retrofitted to a conventional engine lathe, thereby allowing maximal utilization of the structural rigidity of the lathe in minimizing stackup of machining tolerances and lost motion. The assembly comprising the base block 140, slide block 138, the journaled cutting tool 128 and the motors 144, 146 are easily mounted to the lathe's crossfeed mechanism. The spindle encoder 122 is easily mounted to the lathe headstock or other appropriate location. The remaining components such as the computer 160 and amplifiers 156, 158 need not be mounted to the lathe.

As an example of the utility of the FIG. 2 embodiment for cutting close-tolerance grooves, it was used to cut multiple courses of serpentine grooves about 0.25 mm wide and about 1 mm deep in the surface of a stainless steel roller about 1 foot in diameter and about 6 feet long. The grooves were cut without fracturing the cutting tool. Also, the surface finish of the grooves was excellent.

Direct Inflexible Drives

The FIG. 1 and FIG. 2 embodiments described above include examples of three types of direct inflexible drive mechanisms for imparting combined reciprocating and oscillatory motions to the cutting tool. The first type is the mechanical mechanism comprising the tie rod 52 coupling the first cam follower 44 to the slide block 40, as shown in FIG. 1. The second type is the hydraulic mechanism comprising the hydraulic cylinders 64 and 68 employing non-compressible hydraulic fluid to couple the second cam follower 46 to the tool shank 30, as shown in FIG. 1. The third type is the electro-mechanical mechanism comprising the servo motors 144, 146 coupled to the slide block 138 and tool shank 130, respectively, as shown in FIG. 2. Because these inflexible drive mechanisms utilize a minimal number of moving parts and are mountable directly to a conventional engine lathe, they are capable of imparting the requisite close-tolerance reciprocating and oscillatory motions to the cutting tool required to accurately cut narrow, deep serpentine-patterned grooves in a workpiece surface. Such mechanisms also permit such narrow and deep grooves to be cut without tool breakage. In contrast, relatively flexible mechanisms such as that of Geer utilizing a large number of dynamically interacting parts such as multiple series of gear trains, drive shafts, and the like would be inherently incapable of cutting such deep, narrow grooves in a workpiece because of tolerance stacking, lost motion, and backlash.

Having illustrated and described the principles of my invention in several embodiments, it should be apparent to those skilled in the art that the present invention may be modified in arrangement and detail without departing from the principles thereof. I claim as my invention all modifications coming within the scope and spirit of the following claims:

I claim:

1. An apparatus operable with an engine lathe for cutting a circumferential serpentine-patterned groove in a target surface of a workpiece supported and turned about an axis of rotation by the lathe using a cutting tool, the apparatus comprising:
   (a) slide means including a base affixed to the lathe laterally adjacent the target surface and a slide block mounted to the slide base and longitudinally slidable on the base adjacent the target surface;
   (b) tool oscillation means including a first reversible electrical motor mounted to the slide block, the first motor having an armature operably coupled to the cutting tool so as to effect oscillation of the cutting tool about its axis;
   (c) tool reciprocation means including a second reversible electrical motor mounted to the slide base, the second motor having an armature operably coupled to the slide block so as to effect reversible linear sliding motion of the slide block relative to the slide base;
   (d) motor driving means electrically connected to the first and second electrical motors for controllably effecting periodic forward and reverse rotation of the first and second motor armatures as the workpiece is rotating, thereby effecting oscillatory and reciprocating motions, respectively, of the cutting tool relative to the target surface, with the oscillatory and reciprocating motions being synchronous with each other and timed relative to the angular velocity of the workpiece so as to cut a continuous circumferential serpentine-shaped groove of the desired shape in the target surface when the cutting tool is urged into cutting engagement with the target surface.

2. An apparatus as recited in claim 1 further comprising workpiece rotation-sensing means coupled so as to sense the angular velocity, rotational direction, and angular position of the rotating workpiece, and electrically connected to the motor driving means.

3. An apparatus as recited in claim 2 wherein the workpiece rotation-sensing means comprises a rotary encoder.

4. An apparatus as recited in claim 1 further comprising tool journal means mounted to the slide block, in which journal means the cutting tool is coaxially supported so as to allow rotation of the cutting tool about its longitudinal axis as effected by corresponding rotation of the first motor armature.

5. An apparatus as recited in claim 4 wherein the first motor armature is coaxially coupled to the cutting tool.

6. An apparatus as recited in claim 1 wherein the first and second electrical motors are servo motors.

7. An apparatus as recited in claim 6 further comprising first armature rotation sensing means coupled to the first motor armature and electrically connected to the motor driving means, and second armature rotation sensing means coupled to the second motor armature and electrically connected to the motor driving means, the first and second armature rotation sensing means for sensing motor parameters including angular velocity, rotational direction, and angular position of the respective motor armature and generating electrical signals corresponding to said parameters for feedback to the motor driving means.

8. An apparatus as recited in claim 7 wherein the first and second armature rotation sensing means comprise rotary encoders.

9. An apparatus as recited in claim 1 wherein the motor driving means comprises programmable process controller means including electronic memory in which is stored a serpentine pattern-generating algorithm.

10. An apparatus as recited in claim 9 further comprising data entry means electrically connected to the motor driving means for entry of parameter values required for cutting a desired serpentine patterned groove in a target surface having a particular diameter.

11. An apparatus operable with an engine lathe for cutting a circumferential serpentine-patterned groove in a target surface of a workpiece supported and turned about an axis of rotation by the lathe using a cutting tool having a shank, a shank axis, and a cutting end oriented toward the target surface, the apparatus comprising:
(a) linear slide including a base block and a slide block slidably mounted to the base block, the base block affixed to the engine lathe laterally adjacent the target surface so that the slide block is slidable relative to the target surface in both directions along a path longitudinally of and laterally offset from the target surface;
(b) tool holder mounted to the slide for holding the cutting tool so as to allow clockwise and counterclockwise rotation of the tool about its shank axis while the cutting end is oriented toward the target surface;
(c) first reversible motor including an armature, the first motor mounted to the slide block and the armature thereof coaxially coupled to the shank of the cutting tool mounted in the tool holder so as to effect rotation of the cutting tool about its shank axis in a clockwise and counterclockwise direction;
(d) second reversible motor including armature, the second motor mounted to the base and the armature thereof coaxially coupled to a screw threadably engaging the slide block such that, as armature is rotated in either a clockwise or counterclockwise direction, the slide is urged to in a leftward or rightward direction relative to the surface along the path longitudinally of and offset from the target surface;
(e) first armature rotation sensor the armature of the first servo motor;
(f) second armature rotation sensor to the armature of the second servo motor;
(g) spindle rotation sensor operably c to the rotation sensor of the workpiece about its ax of rotation by the lathe;
(h) controller operably connected to the first and second motors, the first and second armature rotation sensors, and the spindle rotation sensor, the controller preset to drive the armatures of the first and second motors in a synchronous manner so as to effect oscillation of the cutting tool about its shank axis coordinated with simultaneous reciprocation of the slide block along the line longitudinally lateral to the axis of rotation of the workpiece when the workpiece is rotated about its axis by the lathe and the cutting tool is urged into cutting engagement with the target surface.

12. A method for cutting a circumferential serpentine-patterned groove in a target surface of a workpiece supported by and turned about an axis of rotation on an engine lathe using a cutting tool of a type used with an engine lathe, the cutting tool having a shank, a shank axis, and a point having at least one cutting edge oriented toward the target surface, the method comprising the steps of:
(a) while turning the workpiece about its rotational axis at an angular velocity and while keeping the tool pointed oriented toward the target surface, driving the tool in a reciprocating movement along a path longitudinally of and laterally offset from the target surface by mounting the tool shank on a linear slide adapted to slidably move in both directions along said path, coupling the slide to an armature of a first reversible motor mounted in a fixed position, and driving the armature of the first motor in periodic clockwise and counterclockwise directions to effect said reciprocating movement of the slide, wherein the reciprocating movement has a period that is timed relative to the angular velocity of the workpiece such that the tool undergoes an integral number of complete cycles of reciprocation for each full turn of the workpiece about its rotational axis;
(b) while driving the tool in a reciprocating movement, driving the tool in an oscillating movement about the shank axis of the tool in synchrony with the period of reciprocation by coaxially mounting the tool shank in a journal mounted on the slide, wherein the journal permits clockwise and counterclockwise rotation of the tool about its shank axis, coupling the tool to an armature of a second reversible motor mounted on the slide, and driving the armature of the second motor in periodic clockwise and counterclockwise directions to effect said oscillating movement of the tool, wherein the oscillating movement is in synchrony with the period of reciprocation so as to maintain the tool point oriented at an appropriate cutting angle relative to the target surface for cutting the serpentine-patterned groove; and
(c) while turning the workpiece about its rotational axis and driving the tool in a reciprocating movement and an oscillating movement synchronous with the reciprocating movement, urging the tool point into cutting engagement with the target surface of the turning workpiece so as to cut the serpentine-patterned groove in the target surface.

13. A method for cutting a circumferential serpentine-patterned groove in a target surface of a workpiece as recited in claim 12 wherein the cutting tool is synchronously oscillated and reciprocated in synchrony with the turning workpiece by
(a) electronically sensing and generating electronic signals corresponding to the angular velocity, angular position, and direction of rotation of the workpiece about its axis of rotation;
(b) electronically sensing and generating electronic signals corresponding to the angular velocity, angular position, and direction of rotation of the armatures of each of the first and second motors; and
(c) conducting the electronic signals corresponding to the angular velocity, angular position, and direction of rotation of each of the workpiece and first and second motors to an electronic controller preset to drive the armatures of each of the first and second motors a predetermined number of complete cycles of clockwise and counterclockwise rotations per each full rotation of the workpiece.

14. A method for cutting a circumferential serpentine-patterned groove in a target surface of a workpiece as recited in claim 12 wherein the slide is coupled to the armature of the first reversible motor by threading into the slide a screw coaxially coupled to the armature of the first motor.

15. A method for cutting a circumferential serpentine-patterned groove in a target surface of a workpiece as recited in claim 12 wherein the tool is coupled to the armature of the second motor by coaxially coupling the tool shank directly to the armature of the second motor.

16. A method for cutting a circumferential serpentine-patterned groove in a target surface of a workpiece as recited in claim 15 wherein the slide is coupled to the armature of the first reversible motor by threading into the slide a screw coaxially coupled to the armature of the first motor.

* * * * *

UNITED STATES PATENT AND TRADEMARK OFFICE
CERTIFICATE OF CORRECTION

PATENT NO. : 5,050,468

DATED : September 24, 1991

INVENTOR(S) : James D. Nydigger

It is certified that error appears in the above-identified patent and that said Letters Patent is hereby corrected as shown below:

ON THE TITLE PAGE

Item [75] "Inventor: James D. Nydigger, Albany, Oreg.", should be --Inventors: James D. Nydigger; Bruce Kelm, both of Albany, Oreg.; George Eaton, Corvallis, Oreg.--;

Column 5, line 11, "or" should be deleted;

Column 12, line 64, "127" should be --121--;

Column 13, line 19, "FIG!" should be --FIG.--;

Column 15, line 48, "to in" should be --to move in--;

Column 15, line 50, "and offset" should be --and laterally offset--;

Column 15, line 52, "sensor the" should be --sensor coupled to--;

Column 15, line 54, "sensor to" should be -sensor coupled to--;

Column 15, line 56, "operably c" should be --operably coupled--;

Column 15, line 57, "ax" should be --axis--; and

UNITED STATES PATENT AND TRADEMARK OFFICE
CERTIFICATE OF CORRECTION

PATENT NO. : 5,050,468

DATED : September 24, 1991

INVENTOR(S) : James D. Nydigger

It is certified that error appears in the above-identified patent and that said Letters Patent is hereby corrected as shown below:

Column 16, line 13, "pointed" should be --point--.

Signed and Sealed this

Twenty-first Day of September, 1993

Attest:

BRUCE LEHMAN

Attesting Officer

Commissioner of Patents and Trademarks